(12) United States Patent
Li et al.

(10) Patent No.: US 12,504,059 B2
(45) Date of Patent: Dec. 23, 2025

(54) LINEAR DRIVING MECHANISM

(71) Applicants: AAC Acoustic Technologies (Shanghai) Co., Ltd., Shanghai (CN); Beijing Xiaomi Robot Technology Co., Ltd., Beijing (CN)

(72) Inventors: Chunjiang Li, Shanghai (CN); Yuntong Li, Shanghai (CN); Bing Xie, Shanghai (CN); Liang Jiang, Shanghai (CN); Chuiyou Zhou, Shanghai (CN)

(73) Assignees: AAC Acoustic Technologies (Shanghai) Co., Ltd., Shanghai (CN); Beijing Xiaomi Robot Technology Co., Ltd., Beijing (CN)

( * ) Notice: Subject to any disclaimer, the term of this patent is extended or adjusted under 35 U.S.C. 154(b) by 0 days.

(21) Appl. No.: 18/805,470

(22) Filed: Aug. 14, 2024

(65) Prior Publication Data
US 2025/0230860 A1    Jul. 17, 2025

Related U.S. Application Data

(63) Continuation of application No. PCT/CN2024/075292, filed on Feb. 1, 2024.

(30) Foreign Application Priority Data

Jan. 11, 2024 (CN) .......................... 202410046336.5

(51) Int. Cl.
*F16H 25/20* (2006.01)
*F16H 25/22* (2006.01)
*H02K 7/06* (2006.01)
*H02K 11/21* (2016.01)
*H02K 21/14* (2006.01)

(52) U.S. Cl.
CPC ..... *F16H 25/2204* (2013.01); *F16H 25/2015* (2013.01); *F16H 25/2252* (2013.01); *H02K 7/06* (2013.01); *H02K 11/21* (2016.01); *H02K 21/14* (2013.01); *F16H 2025/2031* (2013.01); *F16H 2025/2075* (2013.01)

(58) Field of Classification Search
CPC ......... F16H 2025/2075; F16H 25/2252; F16H 2025/2078
See application file for complete search history.

(56) References Cited

U.S. PATENT DOCUMENTS

| | | | | |
|---|---|---|---|---|
| 10,677,329 B2* | 6/2020 | Eyraud | .................... | H02K 7/06 |
| 11,616,416 B2* | 3/2023 | Tucker | .................... | H02K 7/06 310/80 |
| 12,181,027 B2* | 12/2024 | Knoell | .................... | F16H 25/20 |

* cited by examiner

*Primary Examiner* — Gregory Robert Weber
(74) *Attorney, Agent, or Firm* — Wiersch Law Group

(57) ABSTRACT

The present invention provides a linear drive mechanism, including a housing, a front cover, a rear cover, a stator, and a rotor. The linear drive mechanism further includes a rolling lead screw, a first bearing, and a second bearing. The rolling lead screw includes a central lead screw and a lead screw nut. The rotor includes a hollow rotor body and an annular protrusion thereby driving the central lead screw to achieve linear telescopic motion. Compared with the prior art, the linear drive mechanism of the present invention has a good linear drive effect, which is convenient for reducing the length of the lead screw nut, saving costs, and saving installation space.

14 Claims, 3 Drawing Sheets

B-B

LINEAR DRIVING MECHANISM

TECHNICAL FIELD

The present invention relates to the field of linear drive technology, particularly to a linear driving mechanism.

BACKGROUND

The rapid development of the artificial intelligence and robotics industries has led to more stringent requirements for linear actuators due to space and energy efficiency considerations. Linear actuators are moving towards higher integration, smaller size, higher load capacity, and faster response. Linear drive mechanisms are a type of linear actuator that uses a lead screw as the active component, with a nut providing linear output. This means that the nut does not rotate but extends and retracts along the axis, while the lead screw rotates to operate.

In related technologies, standard linear screw actuators mostly adopt coaxial designs, where the motor is connected to the extension or rotation shaft through gears or couplings, pushing the nut to move forward or backward along the axis. Alternatively, they can use parallel transmission mechanisms, where the power source, such as an electric motor or internal combustion engine, outputs torque, which is transmitted to parallel screw shafts through gears or belts. However, in standard planetary roller screw sections, the screw shaft invariably acts as the driving force. If an electric motor is used as the power source, the rotor shaft of the motor and the shaft of the planetary roller screw are integrated, resulting in a larger outer diameter of the motor. Additionally, the nut of the planetary roller screw has a certain size, and both present a tandem structure along the axial direction in space. To ensure system safety, a casing must be set up to constrain the outer diameter of the motor stator and the exterior of the nut into a unified shell, which increases the overall size of the planetary roller screw linear actuator.

Therefore, it is necessary to provide a new linear drive mechanism to solve the above technical problems.

SUMMARY

The purpose of the present invention is to provide a linear driving mechanism with high integration, good linear drive effect, cost savings, installation space saving, and improved production efficiency.

To achieve the above purposes, the present invention provides a linear drive mechanism, comprising a housing having a first housing and a second housing fixedly connected to each other; a front cover and a rear cover respectively fixed to opposite ends of the housing; a stator disposed inside the housing; a rotor disposed inside the stator for being driven by the stator to rotate; a rolling screw rod fixed to one end of the rotor away from the rear cover; a first bearing sleeved and fixed to one end of the rotor and fixed inside the second housing; and a second bearing sleeved and fixed to the other end of the rotor and fixed to the rear cover.

One end of the first housing away from the second housing is fixed to the front cover, and one end of the second housing away from the first housing is fixed to the rear cover. The rolling screw rod comprises a sleeve disposed in the first housing and penetrating the front cover, a screw rod nut fixed in the sleeve near the end of the rear cover, and a central screw rod disposed in the screw rod nut and extending along the axial direction of the screw rod nut. An outer peripheral side of the sleeve is slidingly connected with an inner side of the first housing. The screw rod nut is sleeved on the central screw rod and forms a rotational connection with the central screw rod. The end of the central screw rod near the rear cover is integrally formed with the connection of the rotor, and the rotor rotates to drive the central screw rod to rotate, thereby enabling the screw rod nut to rotate and drive the sleeve to achieve linear telescopic movement.

As an improvement, the rolling screw rod is a planetary roller screw rod; the screw nut comprises a first nut body with a threaded structure, a first mounting groove and a second mounting groove formed by recessing the two ends of the inner wall of the first nut body, a first gear ring fixedly arranged in the first mounting groove, a second gear ring fixedly arranged in the second mounting groove, and a plurality of annular screw rods arranged around the central screw rod, both ends of each annular screw rod are respectively arranged on the first gear ring and the second gear ring and form a rotational connection; the first nut body is fixed in the sleeve.

The central screw rod comprises a first central screw rod body that is disposed inside the first nut body and is provided with a threaded structure; the first central screw rod body is respectively engaged with each of the annular screw rod columns, and each of the annular screw rod columns is engaged with the first nut body.

As an improvement, the rolling screw rod is a ball screw rod, the screw nut comprises a second nut body, a first ball groove formed in a threaded shape on the inner peripheral side of the second nut body, and a plurality of balls arranged in the first ball groove; the second nut body is fixedly arranged in the sleeve.

The central screw rod comprises a second central screw rod body arranged in the second nut body and a threaded second ball groove formed by the outer peripheral depression of the second central screw rod body. The first ball groove is arranged correspondingly to the second ball groove, and the balls are sandwiched between the first ball groove and the second ball groove so that the second central screw rod body and the second nut body form a rolling connection.

As an improvement, the linear drive mechanism further comprises a lock nut, wherein the lock nut is sleeved and fixed at one end of the rotor away from the rear cover, and the lock nut abuts against one side of the first bearing away from the rear cover.

As an improvement, the linear drive mechanism further comprises a first end rod bearing and a second end rod bearing; wherein the first end rod bearing is fixed to one end of the sleeve away from the rear cover, and the second end rod bearing is fixed to the rear cover.

As an improvement, the linear drive mechanism further comprises the rotor comprises a rotor body, a plurality of permanent magnets formed on the outer peripheral side of the rotor body, a ring-shaped bearing block protruding and extending from the outer periphery of the rotor body, and a limit groove formed by a depression at one end of the outer periphery of the rotor body near the rear cover; the end of the rotor body away from the rear cover is fixed to the central screw rod, each permanent magnet is arranged at a distance from the stator, the bearing block is abutted against the side of the first bearing near the rear cover, and the second bearing is sleeved and fixed in the limit groove.

As an improvement, the linear drive mechanism further comprises a position sensor, wherein the position sensor comprises a collecting part fixed to the rear cover and a rotating part fixed to the rotor, and the collecting part and the rotating part are arranged at a relative interval.

As an improvement, the motor formed by the stator and the rotor adopts an 8-pole-9-slot, 10-pole-12-slot structure, or a 14-pole-12-slot structure, or a 16-pole-12-slot structure.

As an improvement, the position sensor is a Hall position sensor, a magnetic encoder position sensor, or an optical encoder position sensor.

As an improvement, the linear drive mechanism further comprises a base fixed in the second housing, and the second bearing is fixed in the base.

As an improvement, the base comprises a base body fixed in the second housing and a base groove formed by recessing from one end of the base body close to the front cover to the other end close to the rear cover; the second bearing is fixed in the base groove.

Compared with the related art, in the linear drive mechanism of the present invention, the rotor is driven to rotate in the housing by the stator, the central screw rod is disposed at one end of the rotor, the first housing and the second housing are correspondingly fixed, and the other end of the first housing is fixed to the front cover, and the other end of the second housing is fixed to the rear cover, thereby achieving separation of the motor area and the rolling screw rod area and improving assembly efficiency. The rolling screw rod comprises a sleeve disposed in the first housing and penetrating the front cover, a screw rod nut fixed in the sleeve near the rear cover, and a central screw rod disposed in the screw rod nut and extending along the axial direction of the screw rod nut; the outer peripheral side of the sleeve is in sliding connection with the inner side of the first housing, and the screw rod nut is sleeved on the central screw rod and forms a rotational connection with the central screw rod; the end of the central screw rod near the rear cover is in one-piece structure with the rotor, and the rotor rotates to drive the central screw rod to rotate, thereby enabling the screw rod nut to rotate and drive the sleeve to achieve linear telescopic motion.

By installing the first bearing and the second bearing at both ends of the rotor, the rotor does not undergo axial motion during rotation. The rotor transfers torque to the screw rod nut during the rotation of the central screw rod, converting it into thrust, and as described in the interaction of forces, the screw rod nut will be pushed to move axially, thereby achieving linear drive motion function of the sleeve. At the same time, the central screw rod of the rolling screw rod is disposed in a one-piece structure with the rotor, which will effectively shorten the length of the integration of the central screw rod and the rotor. The screw rod nut can be independently processed, simplifying the manufacturing difficulty and process, and improving production efficiency. Further saving costs and installation space.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

First Embodiment

Figure 1:
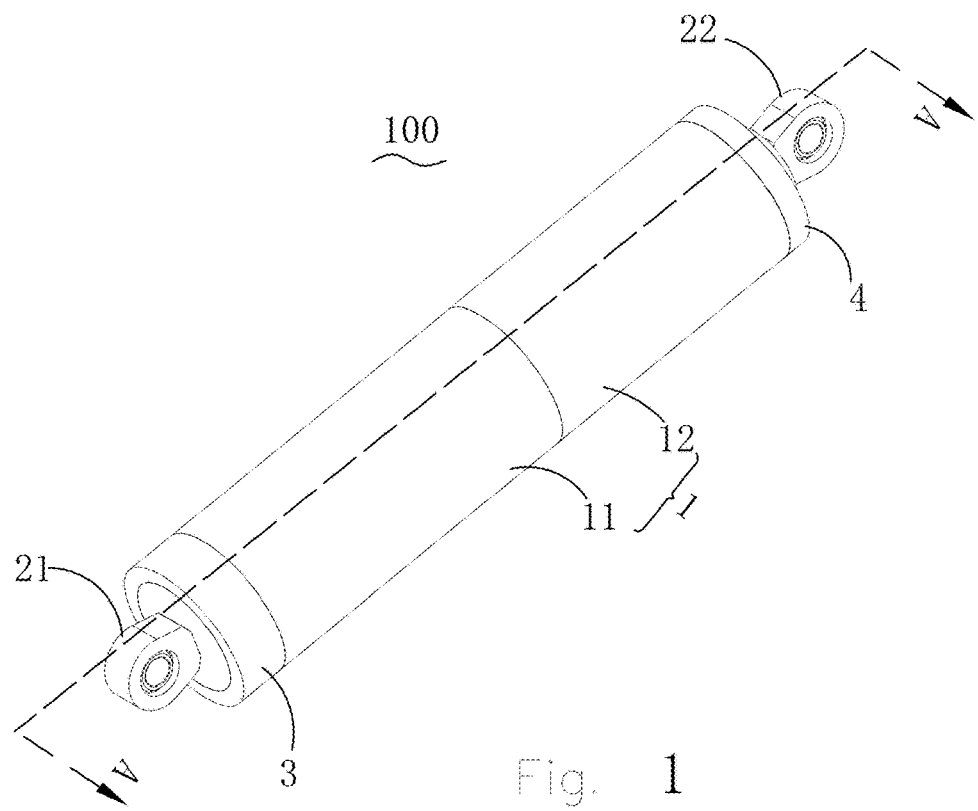
FIG. 1 is an isometric view of a linear drive mechanism in accordance with a first embodiment of the present invention.
Figure 2:
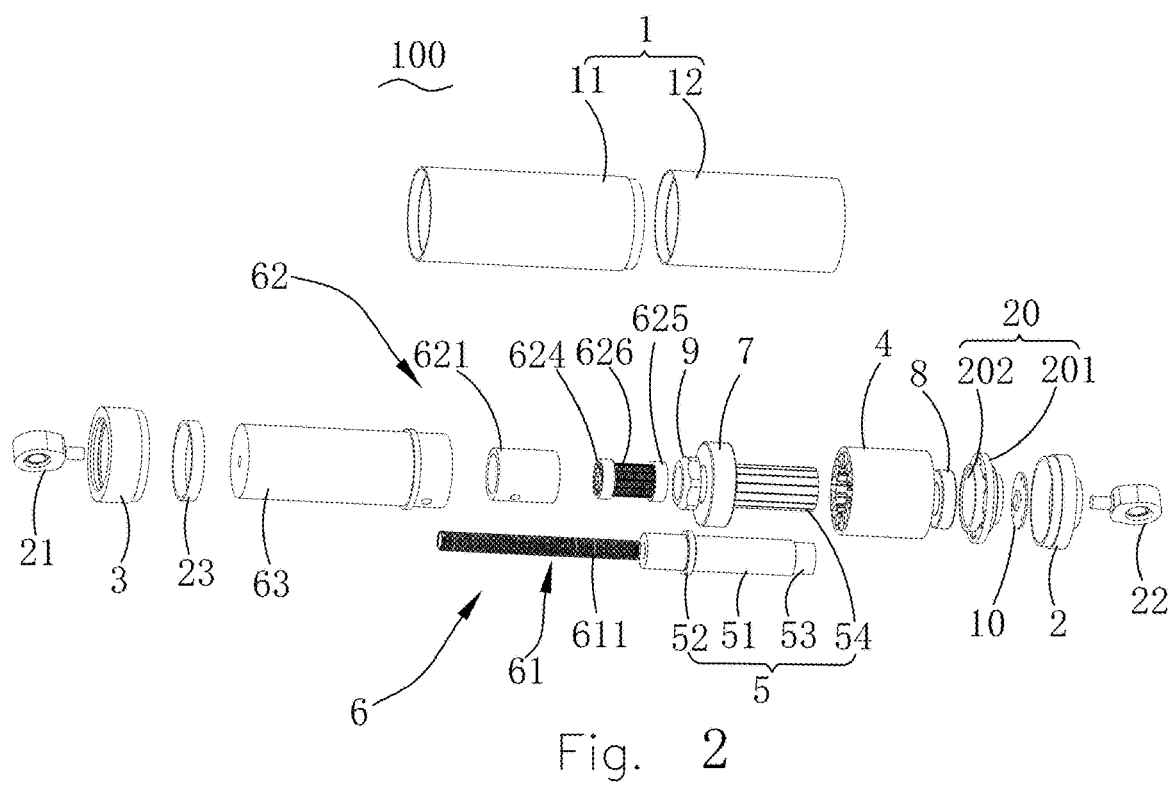
FIG. 2 is an exploded view of the linear drive mechanism in FIG. 1.
Figure 3:
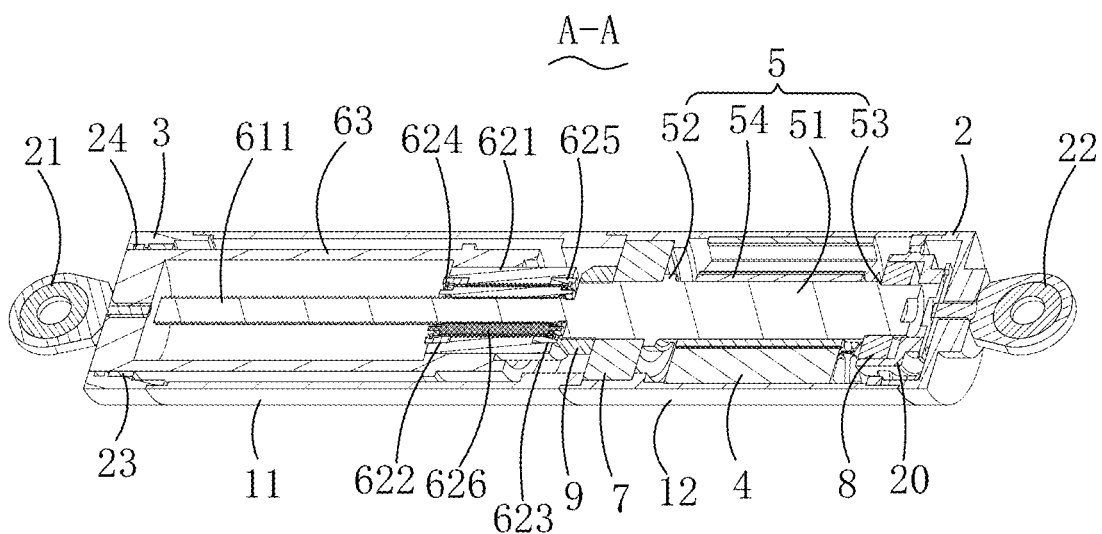
FIG. 3 is a cross-sectional view of the linear drive mechanism taken along line A-A in FIG. 1.

As shown in FIGS. 1-3, a first embodiment of the present invention provides a linear drive mechanism 100, including a housing 1, a front cover 3 and a rear cover 2 fixed to opposite ends of the housing 1, a stator 4 disposed inside the housing 1, and a rotor 5 disposed inside the stator 4 and forming a rotational connection with the stator 4. The housing 1 includes a first housing 11 and a second housing 12 that are fixedly connected to each other, with the other end of the first housing 11 fixed to the front cover 3, and the other end of the second housing 12 fixed to the rear cover 2. The linear drive mechanism 100 further includes a rolling screw rod 6 fixed to one end of the rotor 5 away from the rear cover 2, a first bearing 7 sleeved on one end of the rotor 5 and fixed inside the second housing 12, and a second bearing 8 sleeved on the other end of the rotor 5 and fixed to the rear cover 2. Optionally, the rotor 5 is a hollow rotor shaft, which facilitates reducing the inertia of the rotor 5.

In this embodiment, the first bearing 7 is a four-point contact bearing or angular contact bearing, and the second bearing 8 is a deep groove ball bearing. The installation of the first bearing 7 and the second bearing 8 on both ends of the rotor 5 ensures that the rotor 5 does not undergo axial movement during rotation.

The rolling screw rod 6 can be a planetary roller screw rod, which includes a sleeve 63 that is disposed within the first housing 11 and penetrates the front cover 3, a screw rod nut 62 that is fixed to one end of the sleeve 63 near the rear cover 2, and a central screw rod 61 that is disposed within the screw rod nut 62. The outer peripheral side of the sleeve 63 is slidingly connected to the interior of the first housing 11, and the screw rod nut 62 is sleeved on the central screw rod 61 and forms a rotational connection with the central screw rod 61. One end of the central screw rod 61 near the rear cover 2 is fixed to the rotor 5 in an integrated structure, and the rotor 5 rotates to drive the central screw rod 61 to rotate, thereby enabling the screw rod nut 62 to rotate and drive the sleeve 63 to achieve linear telescopic movement. Optionally, the sleeve 63 and the screw rod nut 62 can be fixedly connected by threads or by pins, and after connection, the rotor 5 and the screw rod nut 62 can rotate coaxially. The screw rod nut 62 and the rotor 5 rotate synchronously as the driving part, and the central screw rod 61 extends and retracts in the axial direction.

Specifically, the stator 4 and the rotor 5 generate magnetic fields for each other. Since the stator 4 is fixed to the second casing 12, the rotor 5 is driven by the stator 4 to rotate. During the rotation of the central screw rod 61, the rotor 5 transfers the torque to the screw nut 62, which is converted into thrust. As described in the interaction of forces, the screw nut 62 will be pushed to move axially, thus achieving the linear driving motion function of the sleeve 63. At the same time, the central screw rod 61 of the rolling screw rod 6 and the rotor 5 are set in an integrated structure, which effectively shortens the length of the integration of the central screw rod 61 and the rotor 5. The screw nut 62 can be independently processed, simplifying the manufacturing difficulty and process, and improving production efficiency. This further saves costs and installation space.

In this embodiment, the linear drive mechanism 100 further includes a sliding bearing 23, which is fixed inside the front cover 3. The sleeve 63 is arranged inside the sliding bearing 23, and the sleeve 63 forms a sliding connection with the sliding bearing 23.

In this embodiment, the linear drive mechanism 100 further includes a sealing ring 24, which is fixed inside the front cover 3 and is disposed on the side of the sliding bearing 23 away from the rear cover 2. The sealing ring 24 achieves the sealing between the sleeve 63 and the front cover 3.

In this embodiment, the lead screw nut 62 includes a first nut body 621 with a threaded structure, first and second annular mounting grooves 622 and 623 recessed from both ends of the inner wall of the first nut body 621, a first gear ring 624 fixedly arranged in the first mounting groove 622, a second gear ring 625 fixedly arranged in the second mounting groove 623, and a plurality of annular lead screw columns 626 arranged around the central lead screw 61. Both ends of each annular lead screw column 626 are arranged on the first gear ring 624 and the second gear ring 625, respectively, and form a rotational connection. The first nut body 621 is fixed in the sleeve 63. The central lead screw 61 includes a first central lead screw 611 body with a threaded structure arranged in the first nut body 621. The first central lead screw 611 body is engaged with each annular lead screw column 626, and each annular lead screw column 626 is engaged with the first nut body 621. The first gear ring 624 and the second gear ring 625 are used to mount a plurality of annular lead screw columns 626, so that the first central lead screw 611 body is engaged with a plurality of annular lead screw columns 626, and a plurality of annular lead screw columns 626 are engaged with the first nut body 621. The stator 4 drives the rotor 5 to rotate the first central lead screw 611 body, and the first central lead screw 611 body drives a plurality of annular lead screw columns 626 to rotate, thereby driving the first lead screw nut 62 body to rotate, and simultaneously driving the sleeve 63 on the first central lead screw 611 body to perform linear telescopic motion.

In this embodiment, the linear drive mechanism 100 further includes a lock nut 9, which is fixedly mounted on the end of the rotor 5 away from the rear cover 2. The lock nut 9 abuts against the side of the first bearing 7 away from the rear cover 2. The axial movement of the first bearing 7 is restricted by the lock nut 9, so that the rotor 5 inside the first bearing 7 does not undergo axial movement.

In this embodiment, the linear drive mechanism 100 further includes a first end rod bearing 21 and a second end rod bearing 22; the first end rod bearing 21 is fixed to the end of the sleeve 63 away from the rear cover 2, and the second end rod bearing 22 is fixed to the rear cover 2. The rotor 5 drives the central screw rod 61 to rotate, so that the screw nut 62 rotates to achieve linear telescopic motion, thereby driving the connected sleeve 63 to perform linear telescopic motion, and pushing or retracting the first end rod bearing 21 in a linear motion.

In this embodiment, the rotor 5 includes a rotor body 51, a plurality of permanent magnets 54 formed on the outer peripheral side of the rotor body 51, a ring-shaped bearing block 52 protruding from the outer periphery of the rotor body 51, and a limit groove 53 recessed at one end of the rotor body 51 near the rear cover 2. The end of the rotor body 51 away from the rear cover 2 is fixed to the central screw rod 61. Each permanent magnet 54 is spaced apart from the stator 4, the bearing block 52 abuts against the side of the first bearing 7 near the rear cover 2, and the second bearing 8 is sleeved and fixed in the limit groove 53. The bearing block 52 supports one end of the first bearing 7, and the other end is supported by a lock nut 9, to ensure the position of the rotor 5 in the axial direction.

In this embodiment, the linear drive mechanism 100 further includes a position sensor 10, which comprises a collecting part 101 fixed to the rear cover 2 and a rotating part 102 fixed to the rotor 5. The collecting part 101 and the rotating part 102 are arranged at a relative interval. Through the rotational movement of the rotating part 102 with the rotor 5, the collecting part 101 collects the angle and number of rotations of the rotating part 102, thereby obtaining the corresponding rotation angle and number of rotations of the central screw rod 61. As described in the rotation of the central screw rod 61, the corresponding linear extension distance of the screw nut 62 is obtained.

In this embodiment, the motor formed by the stator 4 and rotor 5 adopts an 8-pole 9-slot structure, a 10-pole 12-slot structure, a 14-pole 12-slot structure, or a 16-pole 12-slot structure. For example, the 8-pole 9-slot structure represents 8 permanent magnet poles and 9 stator slots.

In this embodiment, the position sensor 10 is a Hall position sensor, a magnetic encoder position sensor, or an optical encoder position sensor.

In this embodiment, the linear drive mechanism 100 further includes a base 20 fixed inside the second housing 12, and the second bearing 8 is fixed inside the base 20. This facilitates the fixing of the second bearing 8 and provides good support.

In this embodiment, the base 20 includes a base body 201 fixed inside the second housing 12 and a base groove 202 formed by recessing from one end of the base body 201 near the front cover 3 to the other end near the rear cover 2. The second bearing 8 is fixed in the base groove 202. This makes the installation of the second bearing 8 convenient and saves installation space.

In this embodiment, the linear drive mechanism 100 is applied to the joints of the robot's limbs for electrically driven linear actuators, resulting in high integration and simplified manufacturing process.

Second Embodiment

Figure 4:
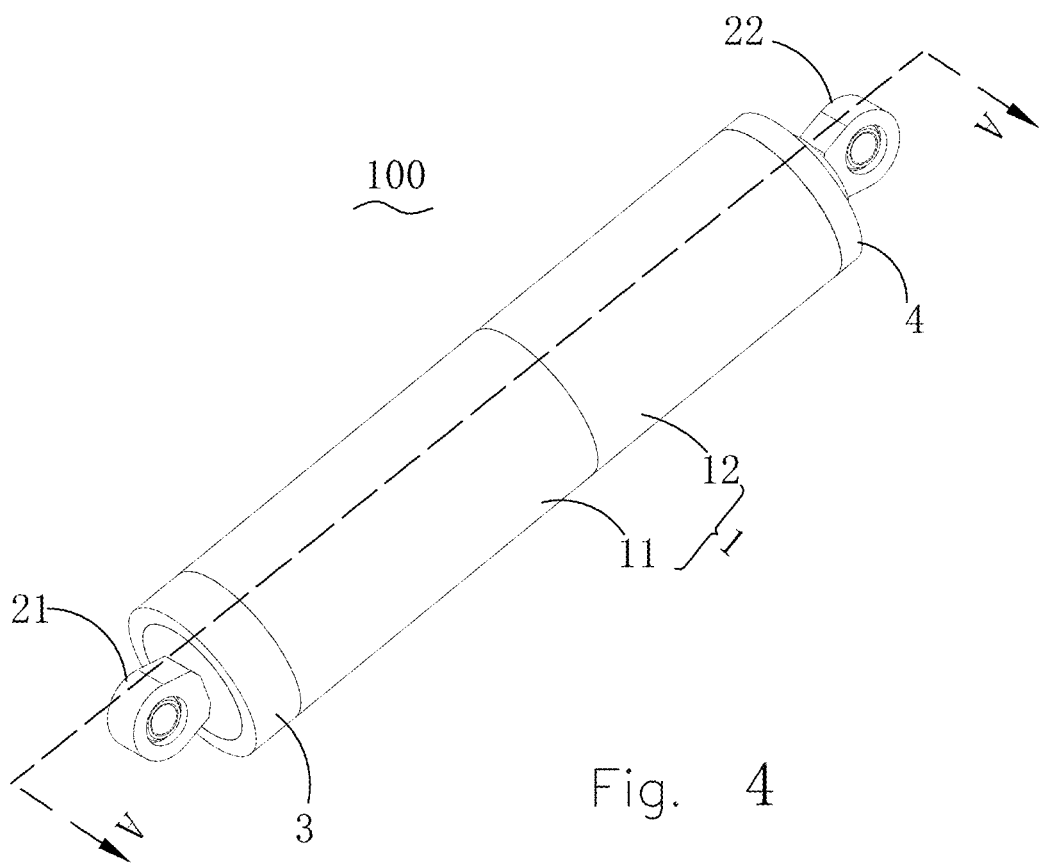
FIG. 4 is an isometric view of a linear drive mechanism in accordance with a second embodiment of the present invention.
Figure 5:
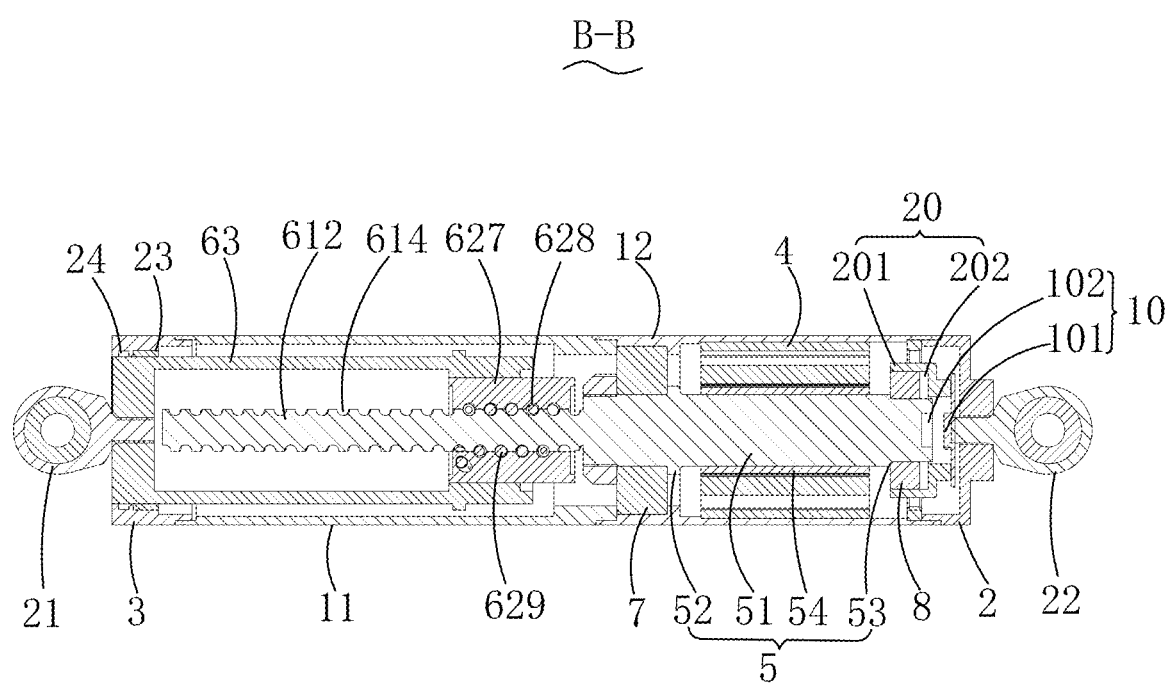
FIG. 5 is a cross-sectional view of the linear drive mechanism taken along line B-B in FIG. 4.

As shown in FIGS. 4-5, together with FIGS. 1-3, a second embodiment is structurally identical to the first embodiment, with the distinguishing feature that the rolling screw rod 6 can be a ball screw rod, and the screw rod nut 62 includes a second nut body 627, a threaded first ball groove 628 recessed on the inner circumferential side of the second nut body 627, and a plurality of balls arranged in the first ball groove 628; the second nut body 627 is fixedly arranged inside the sleeve 63; the central screw rod 61 includes a second central screw rod 612 body arranged inside the second nut body 627 and a threaded second ball groove 613 recessed on the outer circumference of the second central screw rod 612 body, with the first ball groove 628 and the second ball groove 613 arranged correspondingly, and the balls are sandwiched between the first ball groove 628 and the second ball groove 613 to form a rolling connection between the second central screw rod 612 body and the second nut body 627.

The rotation of the rotor 5 drives the second central screw rod 612 body of the central screw rod 61 to rotate, and through the arrangement of balls in the first ball groove 628 and the second ball groove 613, when the second central screw rod 612 body rotates, it drives the second nut body 627 to rotate to achieve linear telescopic motion. Since the second central screw rod 612 body and the rotor 5 are fixedly connected, the second central screw rod 612 body does not move axially; during the rotation of the rotor 5, torque is transmitted to the central screw rod 61 by means of ball transmission, converted into thrust, and since the central screw rod 61 is restricted from axial movement, as described in the interaction of forces, the second nut body 627 will be pushed to move axially. Since the sleeve 63 is fixed to the outer circumference of the second nut body 627, when the second nut body 627 undergoes linear telescopic motion, the sleeve 63 will also push the first end rod bearing 21 to achieve linear telescopic motion.

Compared with the prior art, in the linear drive mechanism of the present invention, the rotor is driven to rotate within the housing by the stator, the central screw rod is disposed at one end of the rotor, the first housing and the second housing are correspondingly fixed, and the other end of the first housing is fixed to the front cover, and the other end of the second housing is fixed to the rear cover, thereby achieving separation of the motor area and the rolling screw rod area and improving assembly efficiency; the rolling screw rod includes a sleeve disposed in the first housing and penetrating the front cover, a screw rod nut fixed in the sleeve near the rear cover, and a central screw rod disposed in the screw rod nut and extending along the axial direction of the screw rod nut; the outer peripheral side of the sleeve forms a sliding connection with the inner side of the first housing, and the screw rod nut is sleeved on the central screw rod and forms a rotational connection with the central screw rod; the end of the central screw rod near the rear cover and the rotor are connected in an integrated structure, and the rotor rotates to drive the central screw rod to rotate, thereby enabling the screw rod nut to rotate and drive the sleeve to achieve linear telescopic motion.

By installing the first bearing and the second bearing at both ends of the rotor, the rotor does not undergo axial motion during rotation. The rotor transfers torque to the screw rod nut during rotation of the central screw rod, converting it into thrust, and as described in the interaction of forces, the screw rod nut will be pushed to move axially, thereby achieving linear drive motion function of the sleeve. At the same time, the central screw rod of the rolling screw rod is disposed in an integrated structure with the rotor, which effectively shortens the length of integration of the central screw rod and the rotor. The screw rod nut can be independently processed, simplifying the manufacturing difficulty and process, and improving production efficiency. Further saving costs and installation space.

The foregoing is merely illustrative of embodiments of the present invention, and it should be noted that modifications may be made to those skilled in the art without departing from the spirit of the invention but are intended to be within the scope of the invention.

What is claimed is:

1. A linear drive mechanism, comprising:
   a housing having a first housing and a second housing fixedly connected to each other;
   a front cover and a rear cover respectively fixed to opposite ends of the housing;
   a stator disposed inside the housing;
   a rotor disposed inside the stator for being driven by the stator to rotate and comprising a solid rotor body;
   a rolling screw rod fixed to one end of the rotor away from the rear cover;
   a first bearing sleeved and fixed to one end of the rotor body and fixed inside the second housing;
   a second bearing sleeved and fixed to the other end of the rotor body and fixed to the rear cover;
   wherein
   the first bearing and the second bearing are both sleeved and fixed to outer surface of the rotor body;
   one end of the first housing away from the second housing is fixed to the front cover, and one end of the second housing away from the first housing is fixed to the rear cover;
   the rolling screw rod comprises a sleeve disposed in the first housing and penetrating the front cover, a screw rod nut fixed in the sleeve near the end of the rear cover, and a central screw rod disposed in the screw rod nut and extending along the axial direction of the screw rod nut;
   an outer peripheral side of the sleeve is slidingly connected with an inner side of the first housing; the screw rod nut is sleeved on the central screw rod and forms a rotational connection with the central screw rod; and
   the end of the central screw rod near the rear cover is integrally formed with the end of the rotor body near the first bearing, and the rotor rotates to drive the central screw rod to rotate, thereby enabling the screw rod nut to rotate and drive the sleeve to achieve linear telescopic movement.

2. The linear drive mechanism as described in claim 1, wherein the rolling screw rod is a planetary roller screw rod; the screw nut comprises a first nut body with a threaded structure, a first mounting groove and a second mounting groove formed by recessing the two ends of the inner wall of the first nut body, a first gear ring fixedly arranged in the first mounting groove, a second gear ring fixedly arranged in the second mounting groove, and a plurality of annular screw rods arranged around the central screw rod, both ends of each annular screw rod are respectively arranged on the first gear ring and the second gear ring and form a rotational connection; the first nut body is fixed in the sleeve;
   the central screw rod comprises a first central screw rod body that is disposed inside the first nut body and is provided with a threaded structure; the first central screw rod body is respectively engaged with each of the annular screw rod columns, and each of the annular screw rod columns is engaged with the first nut body.

3. The linear drive mechanism as described in claim 1, wherein the rolling screw rod is a ball screw rod, the screw nut comprises a second nut body, a first ball groove formed in a threaded shape on the inner peripheral side of the second nut body, and a plurality of balls arranged in the first ball groove; the second nut body is fixedly arranged in the sleeve;
   the central screw rod comprises a second central screw rod body arranged in the second nut body and a threaded second ball groove formed by the outer peripheral depression of the second central screw rod body, the first ball groove is arranged correspondingly to the second ball groove, and the balls are sandwiched between the first ball groove and the second ball groove so that the second central screw rod body and the second nut body form a rolling connection.

4. The linear drive mechanism as described in claim 1, further comprising a lock nut, wherein the lock nut is sleeved and fixed at one end of the rotor away from the rear cover, and the lock nut abuts against one side of the first bearing away from the rear cover.

5. The linear drive mechanism as described in claim 1, further comprising a first end rod bearing and a second end rod bearing; wherein the first end rod bearing is fixed to one end of the sleeve away from the rear cover, and the second end rod bearing is fixed to the rear cover.

6. The linear drive mechanism as described in claim 1, wherein the rotor further comprises a plurality of permanent magnets formed on the outer peripheral side of the rotor body, a ring-shaped bearing block protruding and extending from the outer periphery of the rotor body, and a limit groove formed by a depression at one end of the outer periphery of the rotor body near the rear cover; the end of the rotor body away from the rear cover is fixed to the central screw rod, each permanent magnet is arranged at a distance from the stator, the bearing block is abutted against the side of the first bearing near the rear cover, and the second bearing is sleeved and fixed in the limit groove.

7. The linear drive mechanism as described in claim 1, further comprising a position sensor, wherein the position sensor comprises a collecting part fixed to the rear cover and a rotating part fixed to the rotor, and the collecting part and the rotating part are arranged at a relative interval.

8. The linear drive mechanism as described in claim 1, wherein the motor formed by the stator and the rotor adopts an 8-pole-9-slot, 10-pole-12-slot structure, or a 14-pole-12-slot structure, or a 16-pole-12-slot structure.

9. The linear drive mechanism as described in claim 7, wherein the position sensor is a Hall position sensor, a magnetic encoder position sensor, or an optical encoder position sensor.

10. The linear drive mechanism as described in claim 1, further comprising a base fixed in the second housing, and the second bearing is fixed in the base.

11. The linear drive mechanism as described in claim 10, wherein the base comprises a base body fixed in the second housing and a base groove formed by recessing from one end of the base body close to the front cover to the other end close to the rear cover; the second bearing is fixed in the base groove.

12. The linear drive mechanism as described in claim 1, further comprising a lock out fixedly mounted on the end of the rotor body away from the rear cover, the lock not abuts against the side of the first bearing away from the rear cover.

13. The linear drive mechanism as described in claim 12, wherein the rotor further comprises a ring-shaped bearing block protruding from the outer periphery of the rotor body, the bearing block abuts against the side of the first bearing near the rear cover.

14. A robot, comprising limb joints and the linear drive mechanism as described in claim 1 applied to the limb joints.

\* \* \* \* \*